Dec. 11, 1928.
H. H. EVERHARD
1,695,091
VENTILATING SCREEN
Filed July 19, 1927  2 Sheets-Sheet 1
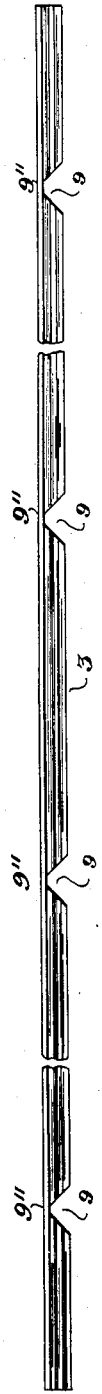
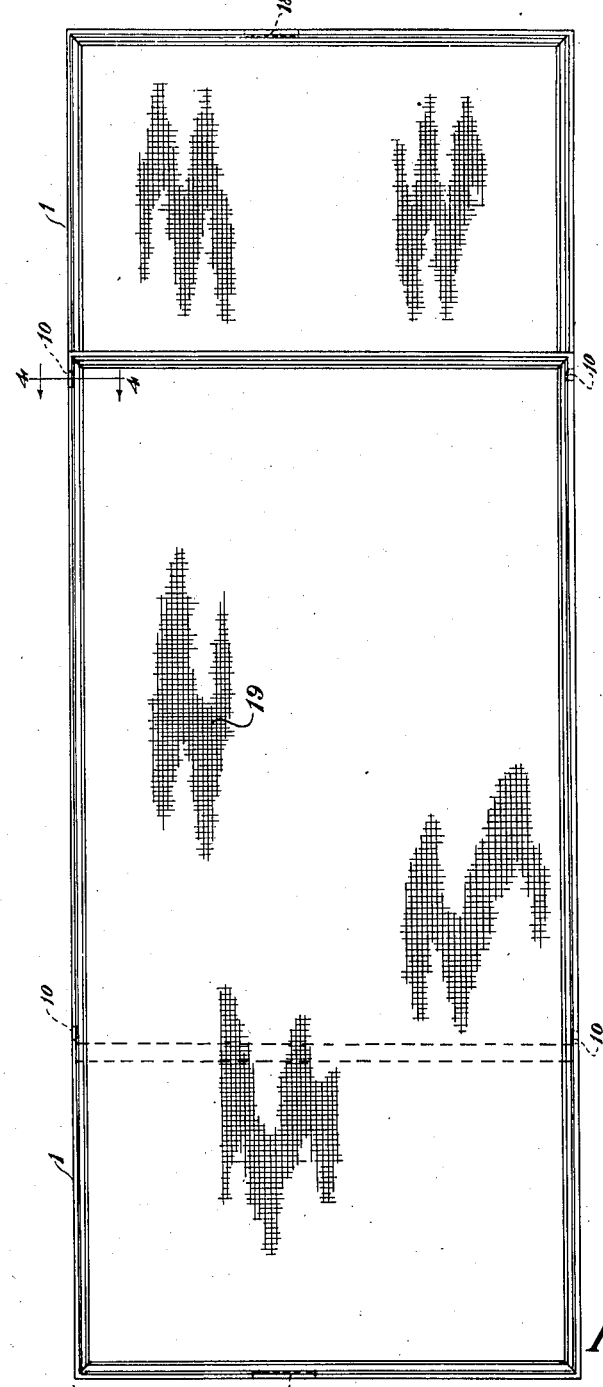
Fig. 2
Fig. 1
Inventor
H.H.Everhard
By Frease and Bond
Attorneys Dec. 11, 1928.
H. H. EVERHARD
VENTILATING SCREEN
Filed July 19, 1927
1,695,091
2 Sheets-Sheet 2
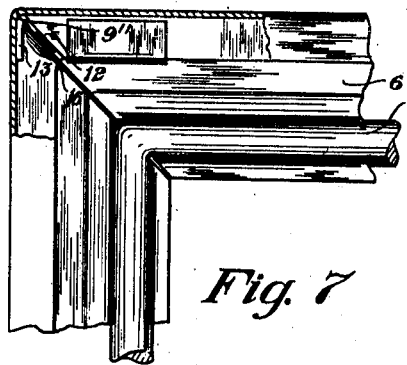
Fig. 7
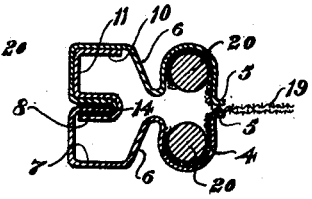
Fig. 4
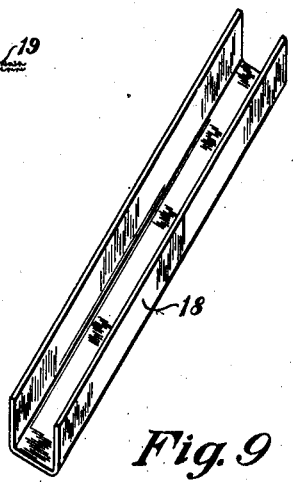
Fig. 9
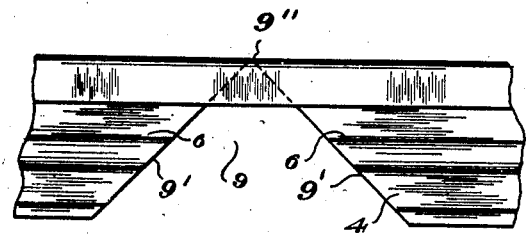
Fig. 3
Fig. 8
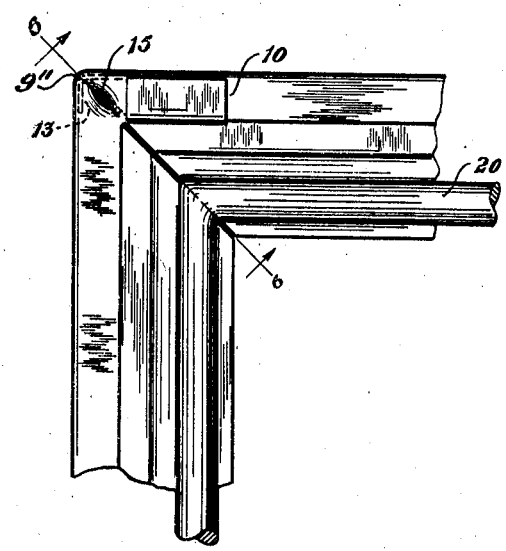
Fig. 5
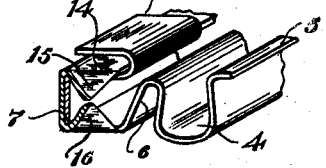
Fig. 6
Inventor
H. H. Everhard
By Freak and Bond
Attorneys Patented Dec. 11, 1928.

1,695,091

UNITED STATES PATENT OFFICE.

HARRY H. EVERHARD, OF CANTON, OHIO.

VENTILATING SCREEN.

Application filed July 19, 1927. Serial No. 206,866.

The invention relates to screens such as are used for ventilating purposes and the like, and more particularly to an adjustable screen arranged to be located in an open window or similar place.

The object of the improvement is to provide a screen of this character comprising a pair of sheet metal frames slidably connected together, each frame being formed of a single strip of metal arranged to be mitered and formed in a simple and inexpensive operation.

The above and other objects may be attained by constructing the screen in the manner illustrated in the accompanying drawings, in which Figure 1 is a front elevation of an adjustable screen embodying the invention;

Fig. 2, an elevation of one of the strips from which a frame is formed, showing the same mitered and ready for forming;

Fig. 3, an enlarged fragmentary elevation of a portion of said strip illustrating the manner of mitering the same;

Fig. 4, an enlarged section on the line 4—4, Fig. 1;

Fig. 5, an enlarged elevation of one corner portion of the frame;

Fig. 6, a section on the line 6—6, Fig. 5;

Fig. 7, a fragmentary elevation of one corner of the frame, parts being broken away to illustrate the slide clip;

Fig. 8, a detail perspective view of one of the slide clips; and

Fig. 9, a detached perspective view of the channel strip for connecting adjoining ends of each frame.

Similar numerals refer to similar parts throughout the drawings.

The screen consists of two frames each indicated at 1, which are slidably connected together whereby the screen as a whole may be adjusted longitudinally to accommodate window frames of varying widths.

Each of these frames is preferably formed of a single sheet metal strip indicated generally at 3. This strip is first formed into the cross sectional shape best illustrated in Fig. 4.

A longitudinal U-shaped groove or channel 4 is formed in the strip, terminating at its inner side in the angular flange 5. At the other side of the groove the metal is bent to incline outward and downward as at 6 to a point substantially in a plane with the bottom of the groove or channel 4, and then formed into a longitudinal box channel portion 7 terminating in the inwardly disposed flange 8 which is located substantially in a plane with the flange 5, thus forming a box channel opening inward toward the inclined side 6.

The strip is then mitered at spaced points, corresponding to the corners to be formed in the frame, as indicated at 9 in Figs. 2 and 3. As best shown in these figures, the portions of the strip thus cut out do not extend entirely across the strip but only to a point directly beneath the inner edge of the flange 8, thus leaving the box channel portion 7 of the strip intact.

The mitered edges 9' of the strip are spaced so as to converge toward the point 9'' in the edge wall of the box channel 7, as best shown in Figure 3; and to complete the frame, the box channel is bent inward at each point 9'' so as to bring the mitered edges together and form a rectangular frame.

In so bending the frame, each side wall of the box channel between the line of the mitered edges 9' is creased and folded inward toward each other as best shown at 15 and 16 in Figure 6, so that the folds will abut each other when the mitered edges are in abutment, thus making a very strong and smooth corner without any exposed edges of sheet metal.

Slide clips indicated generally at 10 may be located at the inner end corners of each frame. Each of these slide clips comprises a channel portion 11 adapted to fit within the box channel portion 7 of the frame, one end of this channel portion being beveled at substantially a forty-five degree angle as shown at 12 and terminating in an ear 13.

A U-shaped guide channel 14 is formed at one side of the channel portion 11 of the guide clip and is adapted to receive the flange 8 of the other frame, only the edge portion of said flange engaging this U-shaped guide channel, as best shown in Fig. 4, for the purpose of reducing the friction to a minimum.

In forming the frame, before the strip 3 is bent into rectangular shape, the guide clips are placed in the box channel portion 7 of the strip 3 and positioned at the mitered cut-out portions 9 corresponding with the corners of the frame at which these guide clips are to be located.

When the strip 3 is bent at each of the mitered cut-out points 9″ at the inner end corners of each frame, the ear 13 of each guide clip will be bent at a right angle to the remainder of the guide clip, as best shown in Fig. 7. At the same time that the strip 3 is bent at these points, the metal in the flange 8, adjacent to the mitered cut-out will be creased and folded down as shown at 15 while the metal in the opposite side of the box channel 7, at this point, will be creased and folded upward as shown at 16 against the inclined end 12 of the guide clip and between the same and the angularly bent ear 13 thereof, thus retaining the guide clip in position at the corner of the frame.

When the strip 3 is completely bent into rectangular form, the abutting ends of the strip are connected together by means of a channel connecting strip 18 which is inserted into the box channel portions 7 of the meeting ends of the strip and spot welded or otherwise connected thereto.

The fabric 19, which forms the screen, may be a textile fabric or a wire screen fabric. This fabric is stretched tightly across each frame and a wire or rod 20, preferably round in cross section, is forced down into each of the channels 4, the diameter of the wire or rod being so proportioned as to wedge and compress the fabric between the rod and the walls of the groove throughout the length of the rod, as disclosed in my prior Patent No. 1,614,191 issued January 11, 1927.

These wires or rods may be substantially U-shaped as described in my prior patent above referred to, whereby the rod not only serves to stretch the fabric tightly across the frame, but when pressed and wedged into the groove it strengthens the frame, particularly at the corners.

From the above it will be obvious that a very simple and strongly constructed adjustable frame is provided for use either as a ventilating screen or fly screen, each frame portion being formed of a single strip of metal bent into rectangular shape and strengthened and reinforced by the rods which retain the screen fabric therein.

As best illustrated in Fig. 4, it will be seen that when the two frames are slidably connected together the screen fabrics of the two frames will be substantially in touch with one another, thus preventing insects from crawling through between the frames.

I claim:

1. A screen frame formed of a single strip of metal having a box channel formed at its outer edge, said frame being mitered at intervals from its inner edge to said channel and bent at said mitered points, the side walls of the channel portion being folded inward at said bends.

2. A screen frame formed of a single strip of metal having a box channel formed at its outer edge, said frame being mitered at intervals from its inner edge to said channel and bent at said mitered points, the side walls of the channel portion being folded inward at said bends, and means for connecting the ends of the strip together.

3. A screen frame formed of a single strip of metal having a box channel formed at its outer edge, said frame being mitered at intervals from its inner edge to said channel and bent at said mitered points, the side walls of the channel portion being folded inward at said bends, and a channel strip located in the channel portions of the adjoining ends of the strip.

4. A screen frame formed of a single strip of metal having a box channel formed at its outer edge, said frame being mitered at intervals from its inner edge to said channel and bent at said mitered points, the side walls of the channel portion being folded inward at said bends, and a slide clip located in the channel of the strip and having an ear extended around one bend of the strip and retained by said folds in the channel.

5. An adjustable screen comprising a pair of like frame members each having a groove extending therearound, a screen fabric on one side of each frame extending across the groove, and rods upon the fabric wedge pressed into the grooves, the frame members being slidably connected together so that screen fabric of each frame is located toward the other frame.

6. A screen frame formed of a single strip of metal having a box channel formed at its outer edge and a groove formed near its inner edge, said frame being mitered at intervals from its inner edge to said channel and bent at said mitered points, the side walls of the channel portion being folded inward at said bends, a screen fabric extending across the groove and rods upon the fabric wedge pressed into the grooves, each rod including an angle strengthening and staying the corresponding angle of the frame.

7. A screen frame formed of a single strip of metal having a box channel formed at its outer edge and a groove formed near its inner edge, said frame being mitered at intervals from its inner edge to said channel and bent at said mitered points, the side walls of the channel portion being folded inward at said bends, a screen fabric extending across the groove and rods upon the fabric wedge pressed into the grooves, each rod including two angles strengthening and staying the corresponding angle of the frame.

8. A corner for a metal frame made of strip metal having a box channel formed at its outer edge portion, there being a cut-out miter in the inner edge portion of the strip extending across the strip to the box channel portion, the channel being bent at said mitered points and the side walls of the channel being folded inward at said bends.

9. A corner for a metal frame made of strip metal having a box channel formed at its outer edge portion, there being a cut-out miter in the inner edge portion of the strip extending across the strip to the box channel portion, the channel being bent at said mitered points, the side walls of the channel being folded inward at said bends, and a slide clip located in the channel and having an ear extended around said bend and retained by said folds in the channel.

In testimony that I claim the above, I have hereunto subscribed my name.

HARRY H. EVERHARD.